United States Patent [19]

Anderson et al.

[11] 4,258,089
[45] Mar. 24, 1981

[54] PRODUCTION OF FUSED THERMOPLASTIC FLUOROCARBON POLYMER COVERINGS ON CYLINDERS

[76] Inventors: Edward P. Anderson, Gaunt Dr., Mickleton, N.J. 08056; Donald G. Curran, 233 Amosland Rd., Norwood, Pa. 19074

[21] Appl. No.: 10,067

[22] Filed: Feb. 7, 1979

Related U.S. Application Data

[63] Continuation of Ser. No. 869,827, Jan. 16, 1978, which is a continuation of Ser. No. 669,820, Mar. 24, 1976, abandoned.

[51] Int. Cl.³ .............................................. B30B 3/00
[52] U.S. Cl. .................... 427/318; 29/132; 100/155 R; 156/86; 156/322; 264/46.9; 427/194; 427/195; 427/358; 427/366; 427/370
[58] Field of Search .................. 156/322, 86, 306; 427/358, 366, 370, 194, 318, 195; 428/421, 422, 461, 463; 29/132, 148.4 D; 432/60; 264/46.9

[56] References Cited

U.S. PATENT DOCUMENTS

| | | | |
|---|---|---|---|
| 2,715,879 | 8/1955 | Sawyer | 29/132 |
| 2,813,041 | 11/1957 | Mitchell et al. | 427/366 |
| 3,227,636 | 1/1966 | deHart | 427/185 |
| 3,240,744 | 3/1966 | Kusiak | 427/185 |
| 3,279,936 | 10/1966 | Forestek | 427/202 |
| 3,426,119 | 2/1969 | Chapman et al. | 29/148.4 D |
| 3,437,032 | 4/1969 | Manghirmalani et al. | 29/132 |
| 3,767,500 | 10/1973 | Tally et al. | 428/421 |
| 3,799,832 | 3/1974 | Reick | 428/421 |
| 3,852,861 | 12/1974 | Baker et al. | 29/132 |
| 3,936,569 | 2/1976 | Miller et al. | 427/318 |
| 3,939,027 | 2/1976 | Ohya et al. | 156/322 |
| 3,942,230 | 3/1976 | Nalband | 427/423 |
| 3,946,136 | 3/1976 | Fitz et al. | 428/421 |
| 3,982,983 | 9/1976 | Abraham et al. | 156/322 |

FOREIGN PATENT DOCUMENTS 51-109972  9/1976  Japan ........................................ 156/322

*Primary Examiner*—John D. Smith
*Attorney, Agent, or Firm*—Mortenson & Uebler

[57] ABSTRACT

Surfaces of thermally conductive substrates are covered with thermoplastic polymers, particularly certain fluorocarbon polymers by bonding said polymeric materials directly to surfaces of said substrates. Adhesives, etchants, or the like are not used as bonding elements. The process involves treating the surfaces to make them wettable by water and then cleaning the surfaces, if necessary, followed by heating the substrate to a temperature at which the polymer melts, gels or softens (herein called the softening point), then placing the polymeric material into contact with the prepared surfaces and applying pressure on the polymeric material to force it into fusing and bonding contact with the heated surface and then cooling the substrate to a temperature below the softening point of the polymer. The products produced are preferably rolls. In their covered form as produced by this invention they are useful as processing rolls in office copier's fusing systems, rolls used in food cooking processes, and the like.

12 Claims, 2 Drawing Figures

PRODUCTION OF FUSED THERMOPLASTIC FLUOROCARBON POLYMER COVERINGS ON CYLINDERS

CROSS REFERENCE TO RELATED APPLICATIONS

This is a continuation of Ser. No. 869,827 filed on Jan. 16, 1978, which was a continuation of Ser. No. 669,820 filed on Mar. 24, 1976 (now abandoned).

BACKGROUND OF THE INVENTION

It has long been understood the fluorocarbon polymers, for example, poly(tetrafluoroethylene), present slippery surfaces having low coefficients of friction to which surfaces other materials do not stick. Similarly, it has been widely known and accepted that in order to make such materials adhere to other surfaces, as, for example, metallic surfaces, one must etch the surfaces, use adhesives, among other steps. Current fluorocarbon polymer etchants are described in such patents as U.S. Pat. Nos. 2,789,063 and 2,809,130. When etched, the fluorocarbon surfaces are bondable and many different adhesive compounds can be used in effecting the bonding. However, the bonds produced do not withstand continuous temperatures above about 350° F. because the etched surface deteriorates or the adhesive bonding system weakens considerably with the result that the polymeric coating peels off or becomes so grossly loosened that the article, such as a roller, becomes useless. While certain fluorocarbon polymers, for example, those made from perfluoroalkyl perfluorovinyl ethers or from tetrafluoroethylene/hexafluoropropylene (known as "TEFLON" PFA and "TEFLON" FEP, respectively, "TEFLON" being a trademark of E. I. duPont de Nemours & Co., Inc.) that have been adhesively bonded withstand said temperatures for substantial periods of time, bonds made on etched surfaces do not. For example, prior art rolls conventionally prepared and used in conventional photocopy machines have a life of only from about 50,000 to about 100,000 copies when the rolls are used at about 400° F.

Therefore, a serious problem continually arises in the operation of copy machines, laminating rolls, and in processes involving foods, photographic films, paper, heat shrinkage and the like.

Thus, an objective of this invention is the provision of a process for covering a thermally conductive substrate with a thermoplastic polymer, preferably a fluorocarbon polymer under conditions that a tight, heat-stable bond is created. A further aim is providing a proces for adhering a fluorocarbon polymer to such a surface, preferably a metallic surface, without using an adhesive or an etchant or similar bonding element. Another purpose is directly bonding a fluorocarbon polymer such as "TEFLON" PFA to a metal. A still further aim is the production of an article, such as a roller, to which has been bonded directly a fluorocarbon under conditions so that the resultant apparatus can be used for long periods of time at temperatures in excess of 350° F. An additional goal is the production of substrates having tightly fused thereon a coating or covering that has a highly smooth finish that has a low amount of voids and a long wear life. These and other objectives will appear hereinafter.

BRIEF DESCRIPTION OF THE INVENTION

The above aims are accomplished by treating the surfaces to be covered in such a way to make them clean, if not so initially, and water wettable. The substrate bearing those surfaces that are to receive, for example, the fluorocarbon polymer is then heated to a temperature of about that where the subject polymer melts, gels, or softens, the surfaces so heated being free of foreign materials such as adhesives or etching materials. The surfaces can be mechanically treated beforehand as by sandblasting or polishing, but such treatments are followed by cleansing and treatment steps to make the surfaces scrupulously clean and water wettable. With the surfaces in the proper condition and at the proper temperature and with the polymer in contact with the surfaces, pressure is exerted on the material to force it into bonding contact with the surfaces. The polymer is normally unheated prior to its contact with the substrate, but it can be heated. Frequently, when the polymers are in the form of a tube, they can be heated prior to pressure contact. Normally, the substrate is heated prior to the pressure contact but need not be. In any event, upon application of said pressure, the polymeric material is caused to become heated to a temperature at which it softens or melts or gels, and as that is happening it is forced against the contacting surfaces of the substrate with the resultant formation of the desired bond and covering that has the desired surface finish.

When the substrate is a roller, the pressure element is normally also a roller which is being rotated and by contact with the substrate roller causes it to rotate also. In all cases the driven pressure element is kept at a temperature well below the softening or similar point of the polymer. Flow of the polymer, due to said pressure, occurs. Occasionally this results in an extrusion that leaves an edge of coating beyond the pressure areas. Such is conveniently and readily trimmed off, if desired.

The invention will be further understood by reference to the drawings and to the examples below all of which is illustrative and not limitative, any parts or percentages being given by weight unless otherwise noted.

FIG. 1 is a perspective of one form of equipment which may be used in the operation of this invention; and FIG. 2, taken on line 2—2 of FIG. 1, shows the preferred roller of this invention in cross-section to illustrate the adhering film.

In FIG. 1 roller 10 represents a substrate in this invention which is to be covered, and is so covered, by the polymeric material 11 fused thereon. Roller 12 is the opposing or pressure roll which is rotated as indicated by arrow 13, the driving force coming from such an element as 14. Roller 12 is kept in one position while roller 10 is movable in the horizontal plane by virtue of its being mounted on a movable frame 15 activated by screw 16. Heating elements 17 and 20 are provided to heat roller 10, and cooling element 18, located near roller 12, allows one to keep it at the desired lower temperature. The rollers are, of course, mounted in proper bearings or bushings 19 to allow rotation, as needed.

In FIG. 2, a cross-section taken on line 2—2 of FIG. 1, the coating or film 11 bonded to roller 10 is shown, this film or coating being of any desired thickness.

DESCRIPTION OF PREFERRED EMBODIMENTS

EXAMPLE I

Figure 1:
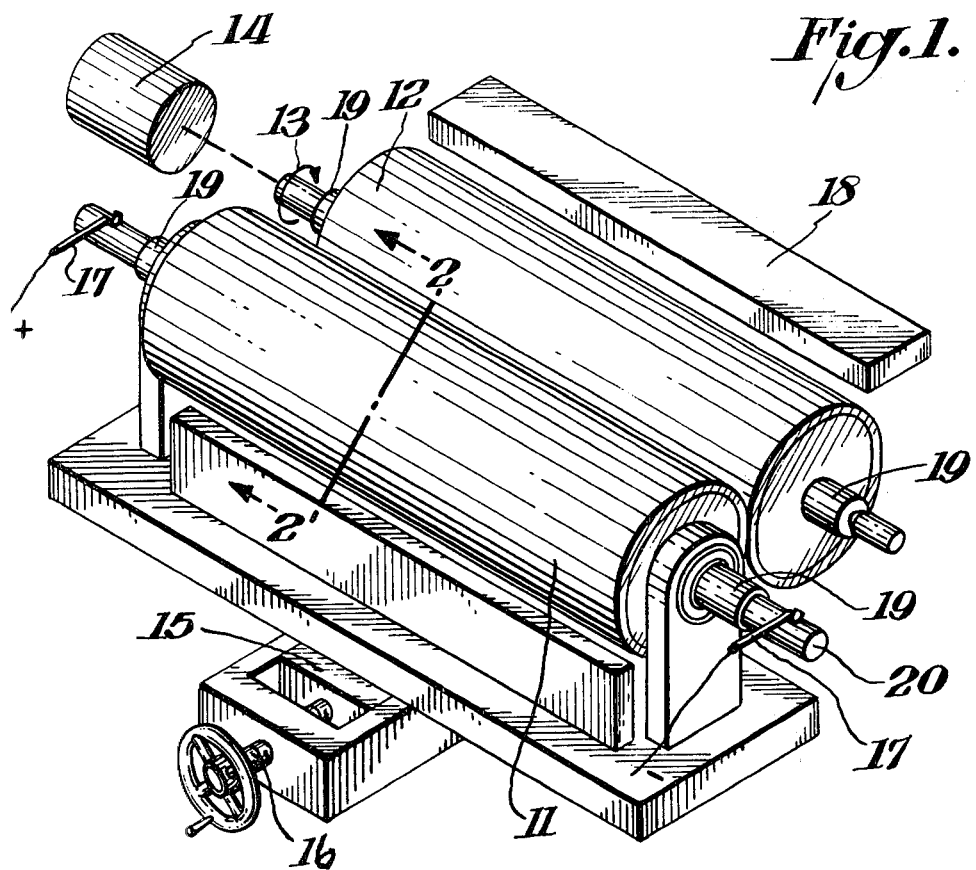
Figure 2:
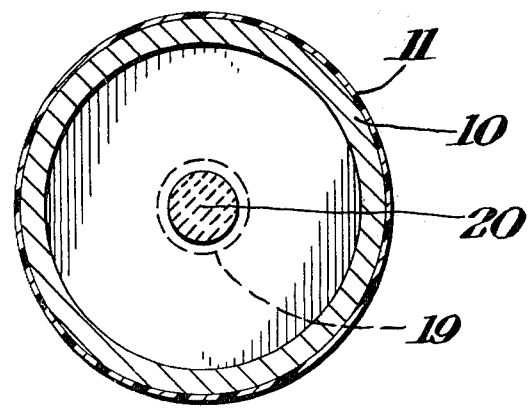

A hollow roller 10 having a 3 inch outside diameter and a length of 15 inches and having an aluminum surface was grit blasted under conventional blasting conditions to clean the surfaces and to produce a water wettable surface. It was then thoroughly cleaned using acetone as a solvent and wash. After this treatment it was baked at 300° F. for a short time in order to remove any contaminates or volatiles that might have remained. The clean roller was then fitted with a "TEFLON" PFA tube or sleeve which had an inside diameter of 2.900 inch and a wall thickness of 0.005 inch. The resultant assembly was then prepared for the pressure treatment by fitting the hubs of the roller 10 with bearings 19 and assembled on a fixture so that it could be rotated and at the same time moved horizontally by means of the cross-slide of a lathe, such as elements 15 and 16 of FIG. 1.

A quartz lamp, Westinghouse 1600 Tc/CL 1600 watt, 230-250 volts with a 16-inch lighted length (element 20) was positioned within the roller but affixed at both ends so that the roller/polymeric tube assembly could be rotated around the heat source.

In close proximity to this assembly was positioned a pressure roll (element 12) which was covered with a silicone rubber, a conventional polymeric material; and over said roll was a "TEFLON" PFA roll cover (not shown for convenience). This roller has also a 3-inch OD. It was mounted on a steel shaft havinge a 1.25 OD. The hardness of the silicone rubber was measured as a shore A durometer of 45 while with the FEP covering on it the shore A durometer of the roller/sleeve assembly was 90.

The pressure or opposing roll 12 was mounted to be driven as shown in FIG. 1, and electric power was supplied to the heating lamp using a conventional source that permitted temperature control, as, for example, a Barber-Coleman solid state 530 series controller and a CB41-00240-025-0-000 power control SCR. A surface pyrometer was used to monitor the surface temperatures. By this route the surface temperature of roll 12 was raised to 600° F. in about 10 minutes.

Elements 12 and 14 (FIG. 1), being power driven, were actuated at 20 RPM, and elements 15 and 16 were activated to bring the roll to be covered (roll 10) to a point where it began to rotate, a minimal driving contact. A micrometer on elements 15 and 16 was then zeroed and movement of elements 15 and 16 was set for a 0.100 inch movement. Thus, the elastomeric roll was deflected 0.100 inch providing a certain nip pressure and causing roll 10 to rotate more rapidly.

Rotation was continued under these conditions for 5 minutes with heat being continuously applied to maintain the 600° F. temperature. At the end of said time, the heat was stopped, and the rolls were allowed to cool to 400° F. before releasing the nip pressure. The pressure roll 12 had reached a temperature of 400° F. during the run.

After the pressure was released the product (roll 10 bearing PFA fused bonded thereto) was allowed to cool to room temperature.

A circumferential cut to form a strip 1 inch wide was made, and this strip was then peeled off to test the adhesion. A steady pull of 3.5 pounds was required to remove the PFA initially and even after extended exposure to 400° F. In a control experiment, etched and adhesively bonded sleeves having high initial peel strengths showed no adhesion after a limited exposure to 400° F.

The surface of the PFA was tested for smoothness by the test described in "Surface Texture", the American Society of Mech. Engineers ASA B46 1-1962, at page 16 A-3 RMS (root mean square), the test being made by a needle which records the dips in the surface by distances and the test showing the measurement to be 2 to 3 micro-inches, a micro-inch being 0.000001 inch. In other words, the greatest deviation from an absolutely smooth surface on this product of this invention, as measured by the distance the needle in the testing device moves, was only around 0.000003 inch.

In a similar experiment, "TEFLON" FEP is used with similar surfaces and peel strengths being attained.

In a still further run, the "TEFLON" PFA tubing that was used had a wall thickness of 0.090 inch. The resultant, fused covering had a peel strength of 3.0 lbs.

EXAMPLE II

In this example a strip of "TEFLON" PFA was used instead of tubing.

The strip was 0.5 inch wide and 0.003 inch thick. Processing occurred as in Example I except that the metal roller did not have the tubing. When the metallic roll reached the temperature of about 600° F., the two rolls were brought together with the deflection being set for 0.100 inch. The strip was then fed between the nip at one end and it was made to wrap the length of the roll in a spiral fashion with overlaps of about 1/16 to about ⅛ inch. As the covering was being effected, the polymeric material became heated, and the overlaps were seen to fuse and disappear, during the 5 minute processing period. Upon cooling, the overlaps could not be seen nor felt, and the surface finish measured 2 to 3 micro-inches. The peel strength was 3.5 to 4 pounds.

EXAMPLE III

Here "TEFLON" PFA powder was used.

The conditions of Example II were repeated, using powder instead of strip material. Dusting of the powder was continued during the rotation/pressure cycle until a layer of about 0.002 inch was formed. After cooling, the coating was found to be so firmly adhered that it could not be peeled off in the peel test. Thus, the peel strength produced by this invention can be equal to the strength of the material in the covering. The finish measurement gave the figure as 10 micro-inches. In another run, the pressure roll was cooled by means of element 18 to prevent sticking with a resultant improvement in the surface finish.

EXAMPLE IV

In this example, a variety of substrates (rollers) was used along with a variety of surface treatments each of which, as in the previous examples, led to the production of wettable surfaces. In each case where an etchant or a grit or the like was used, the treated roll was carefully freed of all foreign substances prior to the rotation/pressure step. In each instance the roll was covered with a PFA tubing having a thickness of 0.005 inch.

| Experiment | Substrate | Treatment | Peel Strength in Lbs. |
|---|---|---|---|
| A | Aluminum | Grit blasted; acetone wash baked at 300° F. | 3.5 |
| B | Aluminum | Grit blasted; Oakite cleaner (160° F. for 5 min.); acid/ Na dichromate etch (10 min. at 150° F.) | 4.5 |
| C | Aluminum | Polished with medium grit emery paper (Norton product #01245-3 wet with denatured alcohol) Polished to a 10 RMS $\mu$ in. finish. Acetone wash. | 5.5 |
| D | Aluminum | As in Exp. C above but including the Oakite cleaning and etch of Exp. B. | 7.5 |
| E | Carbon Steel | As in Exp. C, including an oxalic acid bath. | 2.5 |
| F | Stainless Steel | As in Exp. E. | 3.0 |

In similar experiments using a ethylene/chlorotrifluoroethylene copolymer, or an ethylene/tetrafluoroethylene copolymer or a polyvinyl fluoride similar fused coverings are made having peel strengths and surface finishes like those described above.

EXAMPLE V

To test this process using FEP 160 and to determine if sheet material could be used, the following was done A 3-inch diameter aluminum surfaced roll was polished and etched using an alkaline wash followed by the sodium dichromate-sulfuric acid treatment used in VI B above. The roll was placed in the fusion apparatus and heated to 550° F. When this temperature was reached, the roll to be covered and the pressure roll were brought together for rotation at 20 rpm. An FEP 160 sheet 15.5 inches long by 9.5 inches wide and 0.008 inch thick was then fed between the rolls, its length being slightly longer than the circumference of the roll being covered. The sheet fused to the aluminum with an overlap. The seam created by the overlap fused with the adjacent polymeric material and disappeared. Peel strengths of 3.5 to 4 pounds per inch were obtained.

From the above it can be seen that the polymeric material to be applied to the substrate may be in any desired form which includes powders, strips, sheets, films, tubes, rodding, fabrics, and the like. Such articles may be made from thermoplastic fluorocarbons such as hexafluoropropylene/tetrafluoroethylene copolymers; polychlorotrifluoroethylene; polytetrafluoroethylene polymers; polyvinyl fluoride; polyvinylidene fluoride; vinyl fluoride/tetrafluoroethylene copolymers; vinylidene fluoride/tetrafluoroethylene copolymers; polymerized perfluoroalkyl perfluorovinyl ethers, such as perfluoropropyl perfluorovinyl ether, perfluoromethyl perfluorovinyl ether, etc., and copolymers thereof, as for example with tetrafluoroethylene; such polymers being described in such U.S. Pat. as Nos. 3,132,123; 3,142,665; 3,196,194 (RE 27,028); 3,265,092; 3,500,870; 3,686,154; 3,546,186; and 3,770,711, among others, and in an article on water-resistant, thin-film adhesives by Reardon and Zisman in Ind. Eng. Prod. Res.*

*Develop. Vol. 13, No. 2 1974, pp. 119-122.

A number of these polymers are commercially available under such names as ECTFE "HALAR", obtainable from Allied Chemical Co.; and ETFE "TEFZEL", FEP 100, FEP 160, "TEDLAR", and "TEFLON" PFA, as PFA obtainable from E. I. duPont de Nemours & Co., Inc.; and "KYNAR" from the Pennwalt Co. With reference to the trademarks "TEFLON" PFA and "TEFLON" FEP, these are referred to in ASTM specifications D3307-74 and D2116-74, respectively. The titles of these are, respectively, "Standard Specification for PFA-FLUOROCARBON MOLDING AND EXTRUSION MATERIALS," published April, 1974, and "Standard Specification for FEP-FLUOROCARBON MOLDING AND EXTRUSION MATERIALS," published March, 1974. The former ASTM refers to the PFA-fluorocarbon resin as "copolymers of TFE-fluorocarbon resins containing perfluoroalkoxy side chains" and the latter ASTM refers to the FEP-fluorocarbon resin as "fluorinated ethylene propylene copolymer."

The polymeric materials used in this invention are thermoplastic softening at temperatures in the range of about 200° to 625° F. Thus, the temperatures used in the fusing/pressure step are in said range, and generally being about 30°-75° F. higher than its softening point. Their properties can be determined from such patents as mentioned above and references cited therein. Hithertofore, many of the polymers were used to produce coverings by virtue of their ability to shrink upon heating. Thus, one would form a tube of the polymer having dimensions close to those of the object to be covered, place the tube about the object and then heat the tubing to effect the shrinkage. While tight fitting coverings are so obtainable, no bonding of the polymer onto or into surfaces of the substrate is effected. Thus, peel strengths are zero. On the contrary, in the processes and products of this invention, very effective bonding is obtained upon the fusion of the polymer under pressure with the result that high peel strengths are attained.

From the examples, it can be seen that a variety of substrates can be treated by the process of this invention. These include substrates made of aluminum, steel, stainless steel, carbon steel, chromium surfaced objects, copper, copper alloys, such as bronze or brass, magnesium, titanium alloys, nickel and nickel alloys, zinc surfaces or galvanized metals, among many others, including non-metallic surfaces such as glass, ceramic or polymeric surfaces such as tetrafluoroethylene polymeric surfaces. Since heat transfer is a factor in general and in particular in copy machines, substrates having high heat transfer properties are of most interest.

While the examples have been directed to rollers which are cylindrical, it will be appreciated that one can adapt the process of this invention to rotatable objects of other shapes as elliptical or square or rectangular configurations. The opposing object used to effect the pressure may be similarly shaped or may be a reciprocating pressure element appropriately timed to contact the surface on which fusion is to be effected.

In any event one skilled in the art can from the nature of the particular polymer being used in this invention determine readily the rates of rotation, the amount of pressure to apply, the temperature that is best to use under the conditions chosen, etc. The operations can be readily visually viewed and they can be monitored on automatic bases using timed motors, rate of rotation controls, temperature switches, and the like, all of conventional nature.

The production of wettable surfaces is often helpful in getting optimum peel strengths. A roll which is dirty, has grease on it, is rusty, or the like is first cleaned while a freshly machined metallic surface may need no cleaning and may have wettable surfaces as produced. Wettability is defined at page 92 of *Adhesive Bonding* by Charles V. Cagle, McGraw-Hill Book Co. (1968) using the term "water-break-free" test. If water stands on the subject surface as isolated droplets, the surface is deemed not to be adequately prepared; whereas, if the water forms a uniform film all over or substantially all over the surface, it is designated as having a wettable surface and is ready for the fusion step. As has been pointed out above, no adhesive or etchant is used in the fusion step, the surfaces being free of such materials. However, it is desired on occasion to improve the wettability of the surfaces to be covered; and in doing so, chemicals, including etchants, are frequently used. Such procedures are described in *Adhesive Bonding*. The treatment used will depend upon the substrate, and the chemical or physical treatment given is directed to increase its free energy level so that in the fusion step, either by such effects as oxide production, hydrogen bonding, dimensional changes as in grit blasting, better adhesion results.

To get optimum peel strengths it is preferred to use elastomeric opposing or pressure rolls; that is, rolls that have a soft or yieldable covering. If a steel roll is being covered using a steel roll as the pressure element, one is confronted with line-to-line contacts and, accordingly, uses precise equipment and precise monitoring control. Such difficulties in alignment, surface regularities that may be in the roll or rolls, the T.I.R. of the rolls, or the non-uniformity of the material to be fused, among other factors, are advantageously avoided by the use of elastomeric rolls, pressure loading a roll by spring or air means. The nip area using a metallic roll is minimal; whereas, if the roll has an elastomeric covering, such as silicon rubber over it, the area under pressure is substantially increased. Thus, a preferred embodiment of this invention is the use of such elastomeric rolls with a thin, non-stick covering such as "TEFLON" FEP or PFA.

It is preferred, purely for mechanical convenience, to drive directly the roll that is not being covered rather than the one that is. This is because the latter is the one to be heated, and the heating means can be conveniently provided if that roller is indirectly driven. Other arrangements could be provided if one desired to directly drive the substrate. An advantage exists in driving the non-substrate roll in that it can be permanently mounted in the equipment attached to the driving mechanism, all of which can be fixed at one location.

Elastomers which may be used on the drive or opposing roll may have a wide range of hardness, but preferred are materials having a Type A shore durometer of about 30–90, the roll/elastomer or roll/sleeve composite generally having a durometer of about 90.

In current use in many office copy machines are rolls which are covered with a "TEFLON" enamel. Such rolls present multiple problems besides expense. For example, the life of such rolls is quite short, failures usually occurring after 50,000 to 100,000 copies have been prepared, using the rolls at elevated temperatures. The coverings do not have the desired wear resistance. Attempts to gain better results through the use of etched sleeves bonded by adhesives, such as the silicones and the epoxy polymers, among others, have not brought about the desired results. One reason for this is believed to be that at the elevated temperatures at which the rolls are used in the copier, the etched surface is destroyed. The adhering bond weakens or is destroyed, and the sleeve loosens. Thus, failures occur around about the 200,000 copy figure or less. Enamel coated rolls have been found to have varied lives, the best lasting to about the 300,000 copy figure; while others fail at 50,000. There are many tedious and critical steps involved in producing an enamel coated roll, the mis-firing of one or more of which can lead to said failures. On the other hand, the products of this invention have long lives, still being in very good condition at the elevated temperatures at figures over the 1,000,000 copy number, the temperatures involved being around 400° F. and the test being discontinued as having convincingly demonstrated the starting advantages provided by this invention. One of the reasons the coverings of this invention have such long lives stems from the fact that they are fused bonded to the substrate. The heat treatment plus the pressure effects produce coverings which are not porous. There are present few, it any, voids, and additionally the surfaces are extremely smooth. The variance of the needle movement (Surface Texture, ASA B46.1–1962 by Amer. Soc. of Mech. Engineers, N.Y.C., NY) of only a few millionths of an inch dramatically shows how smooth these coverings are. Thus, they are well adapted to receive an exceedingly high number of other articles, such as sheets of copy paper, with little or no damage to the coverings or to the sheets. The compacted coverings of this invention are resilient, and these factors are important in the high abrasion resistance of the products of this invention.

This invention allows one to place on a substrate a very thin coating, as little as 0.0005 inch, a result not possible using sleeves and heat-shrinking same onto the substrate. If one is limited to the use of extruded tubing, coverings having thicknesses greater than 0.003 inch are only practical. By this invention one can use films, whether blown or extruded. Those are available in the very thin guages. Further, by using powders, one can make virtually any finite thickness. Hithertofore, using PFA powder, it was deemed impossible to produce a covering from it that was 0.005 inch or more in thickness. By this invention such a thickness or thicker coverings are possible.

As mentioned, another advantage of this invention stems from the fact that the coatings or coverings placed on the substrates are significantly less porous and have much superior finishes. Not only are the surfaces much more uniform but they provide, by virtue of the absence or substantial absence of pinholes, better electrical and chemical protection. These factors add very greatly to the life of the substrates even at the higher temperatures. Still further, the excellent surfaces attained by this invention afford superior release properties over normal spray coatings, a factor which is very important in processes involving the passage of articles, such as copy paper, over rolls.

Other advantages arise from the fact that the use of etchants or primers or adhesives is obviated. Economic gain is attained along with the streamlining of processing, since the inherent problems in surface preparation that attend the use of such materials can be avoided. The adverse effects due to the volatility or chemical activity of etchants or the like are not encountered. The use of adhesives or bonding layers cuts down on thermal conductivity. Thus, the articles of this invention, which have a minimum of material on the substrate, have a maximum ability to transfer heat.

While the invention has been disclosed herein in connection with certain embodiments and certain structural or procedural details, it is clear that changes, modifications or equivalents can be used by those skilled in the art; accordingly, such changes within the principles of this invention are intended to be included within the scope of the claims below.

I claim:

1. A process for producing a thermally conductive, metallic cylindrical substrate having bonded to its surface as a covering a thermoplastic fluorocarbon polymer the outer surface of which is smooth and contains a low amount of voids which process comprises heating a metallic substrate sufficiently so that the temperature of its outer surface which consists only of exposed metal is about that of the softening point of said polymer;

placing said polymer having a softening point into direct contact with said exposed metal; and exerting, from a source external to the resultant combination of substrate and polymer, direct pressure on said polymer by means of a rotating elastomeric opposing pressure roll at about said temperature to force said polymer into direct bonding contact with said metal and simultaneously forming the outside surface of said polymer into a smooth, continuous polymeric surface, said process being effected in the absence of bonding agents such as adhesives or etchants, thereby forming in combination with said cylinder a tight, heat-stable bond as characterized by a peel strength of at least 2.5 lbs. per inch which strength has a long-life at temperatures around the maximum working temperature of the polymer.

2. A process in accordance with claim 1 in which said pressure is exerted in an amount and for a time at said temperature until the resultant outside surface is uniform, being free of any overlaps.

3. A process made in accordance with the process of claim 1 in which the resultant direct bond of said polymer to said metal affords a coated substrate capable of use in photocopy machines in which said combination withstands, without failure, exposure at elevated temperatures, such as 400° F., for time periods sufficient to make in excess of one million copies.

4. A process in accordance with the process of claim 1 in which said fluorocarbon polymer comprises an alkoxylated tetrafluoroethylene polymer.

5. A process in accordance with the process of claim 1 in which the outer surface of said polymeric surface has a deviation from an absolutely smooth finish no greater than a few micro-inches.

6. A process in accordance with the process of claim 1 in which said polymeric surface contains a low amount of voids, being substantially non-porous.

7. A process in accordance with the process of claim 1 in which said thickness of said polymer is between about 0.0005 and 0.090 inch.

8. A process in accordance with the process of claim 1 in which the thickness of said polymer is greater than 0.003 inch.

9. A process in accordance with the process of claim 1 in which the polymer layer comprises polymerized perfluoroalkyl perfluorovinyl ether.

10. A process in accordance with the process of claim 1 in which said polymer comprises a copolymer of tetrafluoroethylene and hexafluoroethylene.

11. A process in accordance with the process of claim 1 in which said substrate is a cylinder.

12. A process in accordance with the process of claim 1 in which said substrate is a cylinder, said polymer comprises an alkoxylated tetrafluoroethylene polymer and said covering is between about 0.0005 and 0.090 inch, being smooth, substantially non-porous and free of any overlap.

* * * * *

UNITED STATES PATENT AND TRADEMARK OFFICE
CERTIFICATE OF CORRECTION

PATENT NO. : 4,258,089
DATED : March 24, 1981
INVENTOR(S) : EDWARD P. ANDERSON and DONALD G. CURRAN It is certified that error appears in the above-identified patent and that said Letters Patent are hereby corrected as shown below:

IN CLAIM 10, in the last line, "hexafluoroethylene" has been changed to - - - hexafluoropropylene - - - .

Signed and Sealed this

Twenty-ninth Day of September 1981

[SEAL]

Attest:

GERALD J. MOSSINGHOFF

Attesting Officer     Commissioner of Patents and Trademarks